United States Patent [19]

Furukawa et al.

[11] Patent Number: 5,131,234
[45] Date of Patent: Jul. 21, 1992

[54] ICE STOCK LEVEL DETECTING APPARATUS FOR ICE MAKING MACHINES

[75] Inventors: Yoshio Furukawa, Nagoya; Yoshinori Kamitani, Kounan, both of Japan

[73] Assignee: Hoshizaki Denki Kabushiki Kaisha, Toyoake, Japan

[21] Appl. No.: 771,501

[22] Filed: Oct. 4, 1991

[30] Foreign Application Priority Data

Oct. 9, 1990 [JP] Japan .................... 2-105657[U]

[51] Int. Cl.⁵ ............................................. F25C 1/12
[52] U.S. Cl. ........................................ 62/137; 62/344; 200/61.2; 340/612
[58] Field of Search ............ 62/137, 344; 200/61.2, 200/61.21; 340/612

[56] References Cited

U.S. PATENT DOCUMENTS

| | | | |
|---|---|---|---|
| 2,826,899 | 3/1958 | Muffly | 62/344 X |
| 2,836,038 | 5/1958 | Morgan | 62/137 |
| 2,963,885 | 12/1960 | Loewenthal | 62/344 |
| 3,043,113 | 7/1962 | Muffly | 62/137 |
| 3,234,750 | 2/1966 | Swanson | 62/344 X |
| 3,931,911 | 1/1976 | Kohl | 200/61.21 X |

Primary Examiner—William E. Tapolcai
Attorney, Agent, or Firm—Brooks Haidt Haffner & Delahunty

[57] ABSTRACT

An ice stock detecting apparatus includes a thermostat having a temperature sensor element and a holder for holding the sensor element in a spaced relationship with an ice stocker inner wall. The holder includes a pair of holding member fixedly mounted on the inner wall to project therefrom inwardly of the stocker, and a protecting member extending between the holding members. The holder supports the sensor element with downward inclination toward one end thereof. The protecting member has a top end portion disposed under the sensor element and inclined in a manner similar to the sensor element at a greater angle than the latter.

9 Claims, 3 Drawing Sheets 5,131,234

ICE STOCK LEVEL DETECTING APPARATUS FOR ICE MAKING MACHINES

BACKGROUND OF THE INVENTION

1. Field of the Invention

This invention relates to an ice stock level detecting apparatus for ice making machines and more particularly to a holder assembly for holding the temperature sensor element of a thermostat of an ice stock level detecting apparatus.

2. Description of the Prior Art

In automatic ice making machines, ice pellets or pieces as produced are generally stored in an ice storage chamber (also referred to as a stocker). When the stored ice pieces (i.e. the ice stock level) has reached a predetermined amount, the ice making operation has to be automatically stopped. To this end, the ice making machine is provided with an apparatus for detecting the predetermined amount of the stocked ice pieces, which apparatus generally comprises a thermostat provided with a temperature sensor element adapted to be disposed within the ice storage chamber or stocker.

It has however been found that the thermostat is likely to erroneously operate so that the ice filled state within the stocker may possibly be detected notwithstanding of the fact that the ice pieces are not yet stored to the level corresponding to the position of the temperature sensor element, because it responds to the cold air cooled down by an ice making unit during the ice making operation cycle and by the radiation emanating from those ice pieces which are stored within the stocker. As an attempt for solving this problem, it has heretofore been known to mount the temperature sensor element at the tip of a small diameter tube wound with a heating wire so that the thermostat responds to the lowering in temperature brought about by the contact of the sensor element with the ice piece to thereby detect the predetermined ice stock level. In order to detect with high accuracy the temperature drop caused by the contact with the ice piece, the temperature sensor element should preferably be implemented with a low thermal capacity or a reduced surface area. For this reason, the temperature sensor element was formed in a very thin or fine elongated structure.

Also, the above temperature sensor element is held so as to project from an inner wall surface of the stocker in order that the sensor element can readily contact the ice piece. More specifically, as shown in FIG. 6, a holder A having a projection B of inverted L-like cross-section is fixedly mounted on an inner wall surface C of a stocker by means of screws D or the like, and a temperature sensor element F is mounted on a vertically disposed tongue plate E of the projection B by clamps G. A small diameter tube H extending from the temperature sensor element F is wound with a heating wire I and led out to a controller of the ice making machine (not shown).

As the temperature sensor element F of the above-discussed ice stock level detecting apparatus is very thin and simply supported between a pair of bifurcated suspending arms extending downwardly from the vertical tongue plate E, it is very susceptible to deformation and injury under the influence of external forces possibly applied to the element when the ice pieces are taken out, resulting in the intolerable degradation or lost of the ice detection capability of the ice stock level detecting apparatus. For example, when ice pieces J stored within the stocker are to be taken out, a scoop of a small size having a short half or grip (not shown) is usually employed. In this case, upon taking out the ice pieces, the scoop is put into a heap K of ice pieces J, moved horizontally and then swung upwardly around a root of the grip to thereby scoop up the ice pieces. In this connection, it is noted that so far as the ice stock level detecting apparatus operates normally, the ice stock level within the stocker will remain short of the height of the termperature sensor element F. Accordingly, when the ice pieces are scooped up, an external force of the upward direction is likely to be transmitted to the temperature sensor element F as will be understood from FIG. 6. As a result, the termperature sensor element F is deformed or damaged as mentioned above.

As an approach to protect the temperature sensor element against the deformation, it has also been proposed to enclose the sensor element with a perforated protection tube (refer to Japanese Laid-Open Utility Model Publication No. 141679/1986). However, this structure also suffers from a problem that because the temperature sensor element is housed within the perforated protection tube, the sensor element is not easy to contact with the ice pieces nevertheless of the presence of apertures in the protection tube and that any ice piece once brought into contact with the temperature sensor element through the aperture continues to stay in that contact position until it has been defrozened. Thus, the known sensor element is difficult to reliably detect a decrease in the ice stock level.

SUMMARY OF THE INVENTION

It is therefore an object of this invention to provide an ice stock level detecting apparatus for ice making machines incorporating an improved termperature sensor element holding structure, which facilitates the sensor element to contact with the ice pieces while protecting it against external forces and allowing the ice pieces brought into contact with the sensor element to easily move away therefrom.

The present invention is thus directed to an ice stock level detecting apparatus for ice making machines, which apparatus comprises a thermostat including a small diameter tube portion heated by a heater and a termperature sensor element connected to the small diameter tube portion, and a holder assembly for holding the sensor element at a position spaced from an inner surface of an ice stocker.

With the above object in view, there is provided according to one aspect of the present invention an ice stock level detecting apparatus for an ice making machine, which comprises contact-type temperature sensing means provided with a temperature sensor element, and a holder assembly for holding the sensor element in a spaced relationship with an inner surface of an ice stocker. The holder assembly includes a pair of holding members mounted on the stocker inner surface so as to project therefrom inwardly of the ice stocker to hold the sensor element at both ends thereof, and a protecting member extending between the hlding members. The holding members support the sensor element in a manner allowing it to be inclined downwardly toward one end thereof. The protecting member having a top end portion positioned below the sensor element is disposed with downward inclination toward one end thereof at a greater angle than the sensor element in the same direction as the latter.

According to another aspect of this invention, there is provided an ice stock level detecting apparatus comprising a small diameter tubular portion heated by a heater, a temperature sensing thermostat element having one end connected to the tubular portion, a pair of holding members fixedly secured to the inner wall surface of the ice stocker so as to project therefrom inwardly of the ice stocker to hold the respective end portions of the sensor element in a spaced relationship with the inner wall surface, a protecting member extending between the holding members and under the sensor element, and a shielding member extending between the holding members and above the sensor element. The protecting and shielding members are disposed with downward inclination such that an upper edge of the protecting member and a lower edge of the shielding member are spaced from the sensor element with predetermined gaps, respectively, and that a virtual plane interconnecting the upper edge of the protecting member and the lower edge of the shielding member intersects the sensor element above an axis thereof.

With the above arrangement of the ice stock level detecting apparatus according to the invention, at least a portion of a peripheral surface of the sensor element which is located beyond and above the protecting member can be readily brought into contact with ice pieces to be thereby cooled when the height of a heap of ice pieces reaches a predetermined level, because that portion is exposed within the ice stocker. For taking out the ice pieces, a part of ice pieces will be moved upwardly because of the scooping-up operation as previously described in conjunction with the prior art shown in FIG. 6. In that case, if the protecting member were not present, the upwardly moving ice pieces would contact and deform the sensor element. However, according to this invention, the protecting member is disposed beneath the sensor element to prevent the ice pieces from being moved upwardly beyond the protecting member to thereby protect the sensor element from being injured by the ice pieces.

With the ice stock level detecting apparatus according to one aspect of the present invention, the holder assembly holds the sensor element so as to be inclined toward one end thereof, while the upper edge of the protecting member is disposed with an inclination similar to that of the sensor element but at a greater angle than the latter. Because of this, even the ice pieces are placed between the temperature sensor element and the upper edge of the protecting member, they can slidingly move downwardly along the sensor element or the upper edge of the protecting member while being subjected to a force component in the direction toward the inner space of the stocker. Thus, the ice piece can not remain in contact with the sensor element for a long time but can immediately drop without encouontering any substantial obstacle.

With the ice stock level detecting apparatus according to another aspect of the invention, no inclination relation exists between the sensor element and the upper edge of the protecting member. However, because the protecting and shielding members are disposed such that the upper edge of the protecting member and the lower edge of the shielding member are spaced from the sensor element with the predetermined gaps, respectively, and with such downward inclination that a virtual plane interconnecting the upper edge of the protecting member and the lower edge of the shielding member intersects the sensor element at a position above the longitudinal axis thereof, there is no room for causing the ice pieces to be placed between the sensor element and the upper edge of the protecting member or between the sensor element and the inner surface of the stocker.

The above and other objects, features and advantage of the invention will be better understood from the following description taken in conjunction with preferred embodiments thereof by reference to the accompanying drawings.

DESCRIPTION OF THE PREFERRED EMBODIMENTS

In the following, the present invention will be described in detail in conjunction with preferred embodiments thereof by reference to the accompanying drawings in which like or equivalent parts are denoted by like reference symbols.

Figure 3:
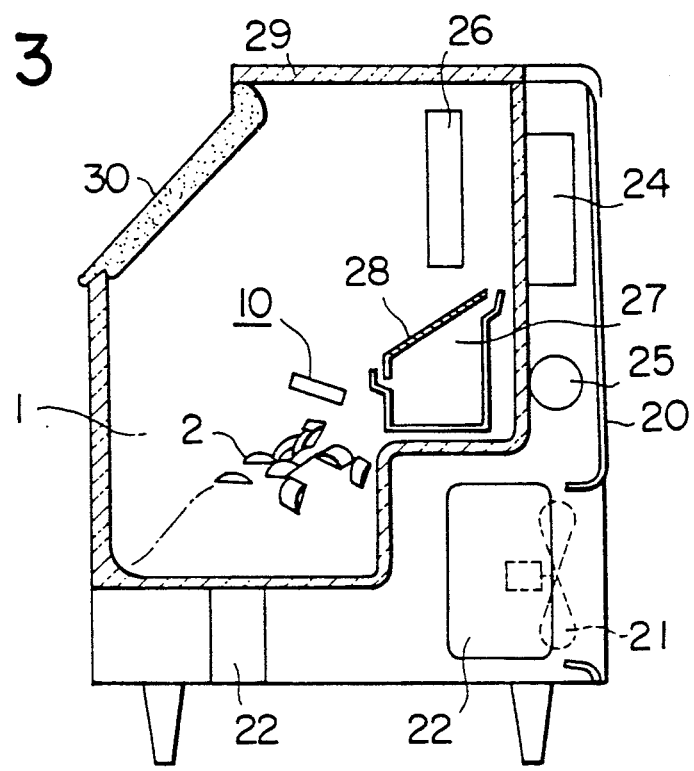
FIG. 3 is a perspective view schematically showing, with several portions in section, a structure of an ice making machine equipped with the ice stock level detecting apparatus shown in FIGS. 1 and 2.

Referring to FIG. 3, an ice making machine includes a casing 20 which accommodates therein a fan motor 21, a coolant compressor 22, a condenser 23 and others, which are these components being interconnected through a coolant circulation pipe (not shown) to constitute a freezing circuit. Disposed within a space communicated with an ice storage chamber or stocker 1 are a raw water tank 27, an ice guide plate 28, an ice making unit 26 and a holder assembly 10 for supporting an ice stock level detecting apparatus and so forth. The ice making unit 26 is adapted to be refrigerated by means of an evaporator (not shown) which constitutes a part of the above-mentiond freezing circuit.

Water stored within the raw water tank 27 is supplied to the ice making unit 26 by a motor-driven pump 25 during an ice making cycle. In a defreezing cycle, ice pellets or pieces developed in the ice making cycle are harvested from the ice making unit 26 into the ice storage chamber or stocker 1 through the ice guide plate 28. A reference numeral 2 schematically denotes the ice pieces thus accumulated within the stocker 1. The components of the ice making machine which are operated in the ice making cycle and the ice defreezing cycle are under the control of a control unit which is accommodated within an electric equipment box 24.

Side walls as well as a ceiling wall 29 of the stocker 1 are constituted by heat insulating plates. A door 30 is normally closed and opened when ice pellets are to be taken out.

Figure 1:
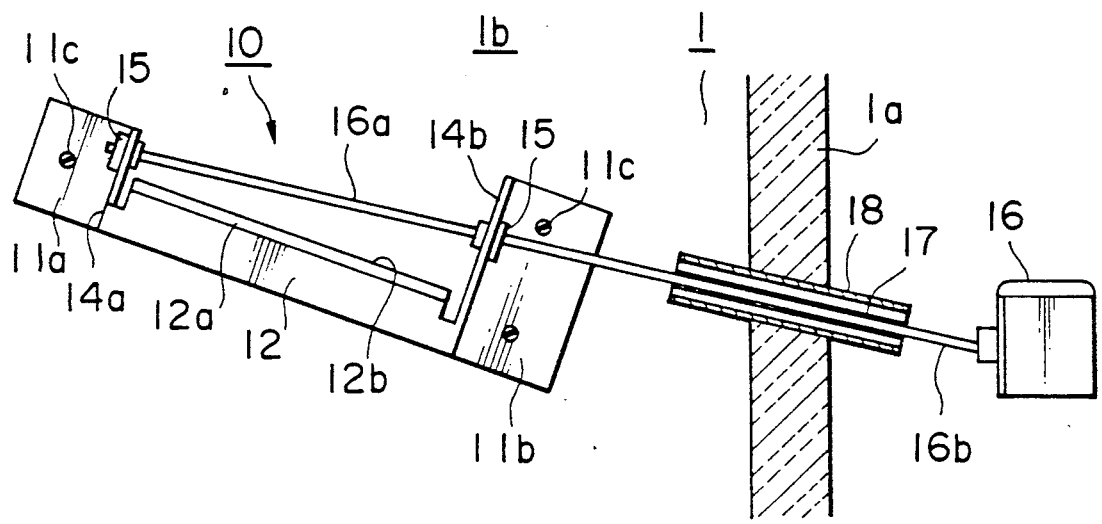
FIG. 1 is a front view showing an ice stock level detecting apparatus according to a first embodiment of the present invention.
Figure 2:
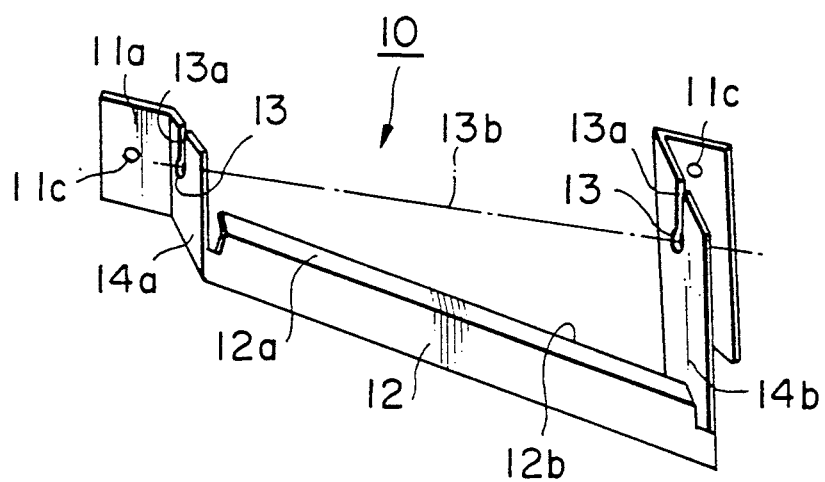
FIG. 2 is a perspective view generally showing a holder assembly of the apparatus shown in FIG. 1.

FIG. 1 is a schematic view showing in what manner the afore-mentioned holder assembly 10, a thermostat 16 and a heater 17 constituting parts of the ice stock level detecting apparatus are mounted, and FIG. 2 shows in detail only the holder assembly 10.

Referring to FIGS. 1 and 2, the holder assembly 10 includes a pair of spaced mounting base portions 11a and 11b having respective screw holes 11c formed therein. Projecting from the mounting bases 11a and 11b are holding members 14a and 14b connected together at front ends thereof by a protecting or guard member 12.

The holding members 14a and 14b are formed with apertures 13 for mounting therein bushings 15 (shown in FIG. 1), respectively. Each aperture 13 is communicated with a slot 13a which upwardly extends therefrom to the top of the corresponding holding member. A single-dot dash line 13b represents a center axis extending through the centers of the apertures 13. A temperature sensor element 16a of the thermostat 16 shown in FIG. 1 is mounted in such orientation that the longitudinal axis thereof coincides with the center axis 13b.

Turning back to FIG. 1, the temperature sensor element 16a of the thermostat 16 inserted through the known bushings 15, which are fitted in the holding members 14a and 14b of the holder assembly 10, extends to the right as viewed in the figure and terminates in a small diameter tubular portion 16b. The tubular portion 16b extends through a wall 1a of the ice storage chamber or stocker 1 with a sleeve 18 being interposed therebetween, in which the tubular portion 16b is enclosed by a heater 17 in a manner known.

The holder assembly 10 is mounted on an inner wall surface 1b of the stocker 1 such that the temperature sensor element 16a is disposed with downward inclination toward the right-hand side so that the small diameter tube portion 16b and the heater 17 assume a lower level than the temperature sensor element. Distance between the centers of the apertures 13 formed in the holding members 14a and 14b and the mounting surface of the base portions 11a and 11b is preferably selected to be of such a size that at least one ice piece or pellet can pass downwardly through a gap defined by the temperature sensor element 16a and the opposite inner wall surface 1b of the stocker 1 and that the gap is progressively increased toward the small diameter tube portion 16a. Further, the top end portion 12a of the protecting or guard member 12 is bent with such inclination relative to the apertures 13 that a space or gap defined between a top edge 12b of the bent portion 12a and the center axis 13b of the apertures 13 and hence the temperature sensor element 16a is progressively increased toward the right-hand side as viewed in the figure.

In the ice making machine having the above-described ice stock level detector, when the amount of the ice pieces within the stocker 1 is progressively increased and reached to the level where the ice piece 2 (FIG. 3) is brought into contact with the temperature sensor element 16a to thereby absorb heat therefrom, the thermostat 16 is then actuated to stop the ice making operation cycle in a known manner. When the level of the heap of ice pellets becomes lower, the ice piece 2 placed in contact with the temperature sensor element 16a tends to slidingly move to the right along the temperature sensor element 16a and the top edge 12b of the guard member 12 while being subjected to a downward force component until the ice pellet 2 drops passing through the gap defined between the top edge 12b and the temperature sensor element 16a or passing beyond the top edge 12b. Further, even the ice pellets are held between the temperature sensor element 16a and the opposite inner wall surface 1b of the stocker 1, they can readily drop because the temperature sensor element 16a is disposed with such inclination that the distance between the element 16a and the opposite inner wall surface 1b of the stocker 1 progressively increases toward the right-hand side as previously described. Thus, they provide no obstacle to the detection of decrease in the amount or level of the heap of ice pellets.

It should further be mentioned that because the end portions of the temperature sensor element 16a and the top edge 12b of the guard member 12 located closer to the heater 17 heating the small diameter tube portion 16b are inclined downwardly, i.e. because the heater 17 is mounted at a lower vertical level, the ice pellet 2 brought into contact with the temperature sensor element 16a tends to be displaced rightwardly (as viewed in the figure) to a location where the temperature sensitivity of the element 16a is high. Thus, the ice level detection sensitivity is correspondingly enhanced. In this conjunction, it should be added that if lowering of the detection sensitivity to some extent is permissible, the temperature sensor element 16a and the top edge 12b of the guard member 12 may be disposed with downward inclination in the opposite direction (i.e. toward the left in FIGS. 1 and 2).

The present invention is never restricted to the first embodiment described above but susceptible to various modifications and changes in design, some of which will be described below.

Figure 4:
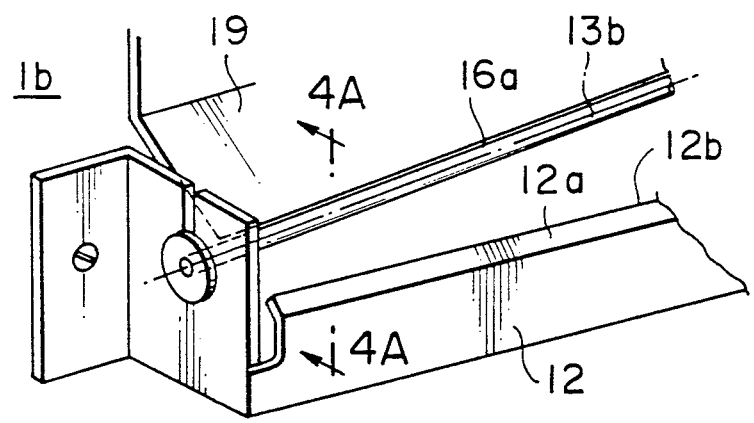
FIG. 4 is a fragmental perspective view showing a holder assembly according to a second embodiment of the invention.
Figure 4A:
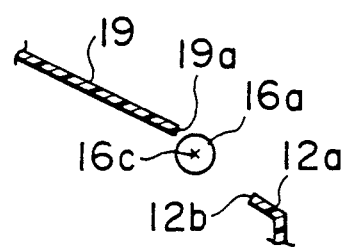
FIG. 4A is a sectional view taken along a line 4A—4A in FIG. 4.

FIG. 4 shows a second embodiment of the invention (only a half of the holder assembly is illustrated for simplification). Referring to FIG. 4, a shielding member 19 is mounted on the inner wall surface 1b of the stocker 1 at a position to overlie the temperature sensor element 16a to thereby partially cover the gap defined between the inner wall surface 1b and the temperature sensor element 16a. The front edge 19a of the shielding member 19 should be preferably positioned as close as possible to the temperature sensor element 16a so that no ice pellets can be placed between the front edge 19a and the temperature sensor element 16a. Additionally, the shielding member 19 should be preferably so disposed that when the front edge 19a is virtually extended forwardly, the virtual extension will intersect the temperature sensor element 16a above the center axis 13b thereof, as can be seen in FIG. 4A. With the shielding member 19 being provided in this manner, it is possible to ensure that the ice pellets are positively prevented from staying between the temperature sensor element 16a and the opposite inner wall 1a of the stocker 1 without employing such an arrangement that the distance between them is progressively increased as described hereinbefore in conjunction with FIG. 1.

Figure 5:
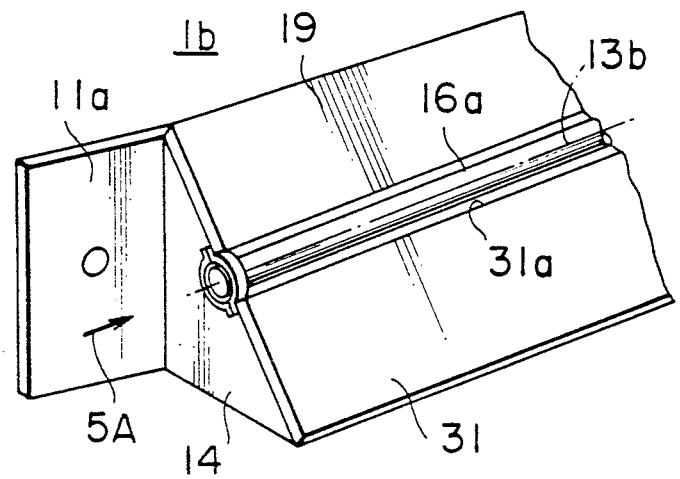
FIG. 5 is a fragmental perspective view showing a holder assembly according to a third embodiment of the invention.
Figure 5A:
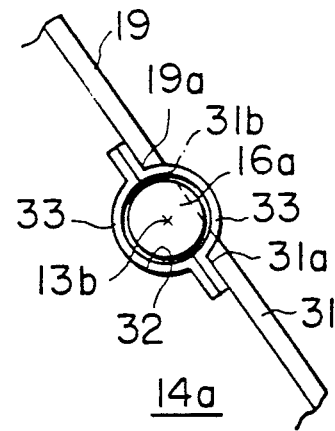
FIG. 5A is an end view taken in the direction indicated by an arrow 5A in FIG. 5.
Figure 6:
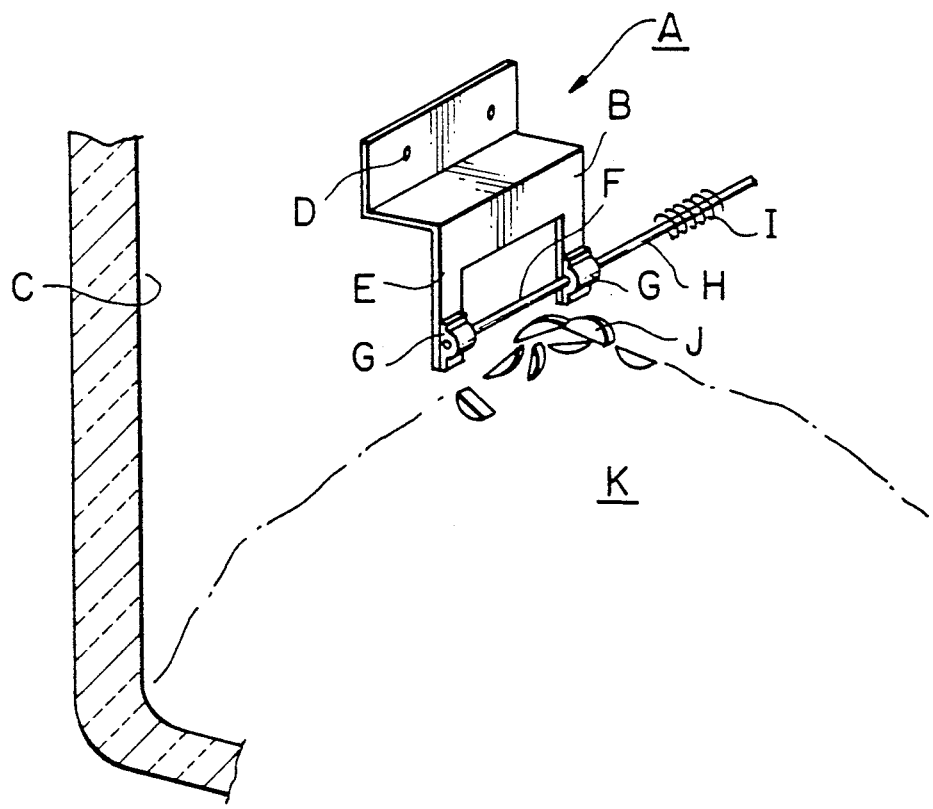
FIG. 6 is a perspective view showing a structure of a conventional ice stock level detecting apparatus.

FIGS. 5 and 5A show a third embodiment of the invention (only a half of the holder assembly is illustrated for simplification). Referring to FIGS. 5 and 5A, the holding member 14a extending from the mounting base portion 11a is configured in a triangular shape and the temperature sensor element 16a is supported on a semicircular notch 32 formed in the oblique side edge of the holding member 14a through a suitable cushion member 33. It should be understood that a right half portion of the holder assembly according to the third embodiment is structured similarly to the left half portion, although not shown, and the right mounting base portion may be positioned at the same level as the left mounting base portion or alternatively at a level lower or higher than the latter. In order to securely hold the temperature sensor element 16a, the lateral edge portion of the shielding member 19 is mounted on the oblique edge of the holding member 14a by appropriate means so as to press the cushion member 33 from above, while the guard member 31 is also mounted on the oblique side of the holding member 14a by suitable means to press down the cushion member 33.

In this way, the shielding member 19 disposed above the termperature sensor element 16a covers the gap defined between the inner stocker wall surface 1b and the temperature sensor element 16a. As in the second embodiment, the front edge 19a of the shielding member 19 is preferably positioned as close as possible to the temperature sensor element 16a so that any ice pellets are inhibited from being held between the front edge 19a and the temperature sensor element 16a. Further, the shielding member 19 should be so disposed that a virtual forward extension of the front edge 19a thereof intersects the temperature sensor element 16a above the center axis thereof as can be seen in FIG. 5A. Furthermore, it is desireable to dispose the guard member 31 as close as possible to the temperature sensor element 16a such that the ice pieces can be easily brought into contact with the temperature sensor element 16a. It is also required that ice pieces be positively prevented from being held between the rear edge 31a of the guard member 31 and the temperature sensor element 16a, and that a virtual rearward extention of the rear edge 31a will intersect the temperature sensor element 16a above the center axis 13 thereof, as can be seen in FIG. 5A. Namely, a virtual plane 31b interconnecting the lower edge or front edge 19a of the shielding member 19 and the upper edge or rear edge 31a of the guard member 31 should intersect the temperature sensor element 16a at a position above the center axis 13b thereof.

In the above described third embodiment, the temperature sensor element 16a and the upper edge of the guard member 31 need not be provided in a rather complicated oblique relation as in the first and second embodiments in order to achieve the object of the present invention, as the shielding member 19 and the guard member 31 are mounted on the oblique sides of the triangular holding members 14a (if the cushion member 33 is pressed down by another not shown clamp means, the shielding member 19 and the guard member 31 may be mounted on the inner wall 1b of the stocker), so that the shielding member 19 and the guard member 31 extend inwardly of the shorcker 1 from the inner wall 1b thereof with their respective lower and upper edges being positioned close to the temperature sensor element 16a.

It will be appreciated from the foregoing that although the temperature sensor element of the thermostat is mounted within the stocker in the naked state by the holder assembly, it can be protected against the influence of possible external forces by the guard member provided in front of the sensor element while allowing the latter to be easily brought into contact with the ice pieces. Thus, proper detection of the ice stock level within the stocker can be ensured with improved reliability.

In the first and second embodiments, both the temperature sensor element and the guard member are inclined in the same direction to facilitate the ice pieces disposed thereon to move and drop, so that decrease in the ice stock level or amount within the stocker can be detected with a high reliability. Further, by inclining the temperature sensor element such that the end portion thereof located closer to the heater is lower than the other end, the ice pieces above the sensor element tend to move toward the heater. This means that the detection sensitivity is increased.

By providing the shielding member as in the second and third embodiments, it is possible to positively prevent the ice pieces from staying between the inner wall surface of the stocker and the temperature sensor element, contributing to enhancement of reliability of the ice stock level detection.

Further, by providing the oblique guard member similarly to the shielding member as in the third embodiment, there is no need to dispose the temperature sensor element and the guard member in a complicated oblique positional relation, resulting in a simplified structure of the stored ice level detecting apparatus while facilitating the mounting thereof on the inner wall surface of the stocker.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described benig merely a preferred or exemplary embodiment thereof.

We claim:

1. An ice stock level detecting apparatus for an ice making machine, comprising:
    contact-type temperature sensing means including a temperature sensor element having opposed end portions; and
    a holder assembly for holding said sensor element in a spaced relationship with an inner surface of an ice storage chamber, said holder assembly including a pair of holding members mounted on the inner surface of the ice storage chamber and projecting therefrom inwardly of the ice storage chamber to hold the corresponding end portions of said sensor element, and a protecting member extending between said holding members, said holding members supporting said sensor element so that it inclines downwardly toward one of said end portions, said protecting member having a top end portion positioned below said sensor element and disposed with downward inclination toward said one end portion of said sensor element at a greater angle than said sensor element.

2. An ice stock level detecting apparatus according to claim 1, wherein said temperature sensing means comprises a thermostat having a small diameter tubular portion connected to said one end portion of said sensor element and heated by a heater.

3. An ice stock level detecting apparatus according to claim 2, said holding members being formed with apertures for holding said sensor element at said opposed end portions, respectively, wherein a distance from a line between centers of said apertures to the inner surface of the ice storage chamber on which said holding members are mounted is designed so that at least one ice piece can pass downwardly between said sensor element when mounted on said holding members in said apertures and the inner surface of the ice storage chamber and that said distance is progressively increased toward said heater of said thermostat.

4. An ice stock level detecting apparatus according to claim 3, said top end portion of said protecting member obliquely extending toward said apertures, wherein a distance between an upper edge of said top end portion and said sensor element is increased toward said heater by downwardly inclining said upper edge at a greater angle than said sensor element.

5. An ice stock level detecting apparatus for an ice making machine, comprising:
    a small diameter tubular portion heated by a heater;
    a temperature sensor thermostat element having opposed end portions one of which is connected to said tubular portion; and
    a holder assembly for holding said sensor element in a spaced relationship with an inner wall surface of an ice stocker, said holder assembly including a pair of holding members fixedly secured to the inner wall surface and projecting from said inner wall surface inwardly of the ice stocker to hold said respective end portions of said sensor element, a protecting member extending between said pair of holding members and disposed under said sensor element, and a shielding member extending between said holding members and disposed above said sensor element, said protecting and shielding members being disposed with downward inclination from an upper edge of said shielding member to a lower edge of said protecting member such that an upper edge of said protecting member and a lower edge of said shielding member are spaced from said sensor element with predetermined gaps, respectively, and that a virtual plane interconnecting said upper edge of said protecting member and said lower edge of said shielding member intersects said sensor element above an axis thereof.

6. An ice stock level detecting apparatus according to claim 5, wherein said holding members are of a substantially triangular shape and have substantially semicircular notches formed in oblique edges thereof, in which said sensor element is held.

7. An ice stock level detecting apparatus according to claim 6, wherein said sesor element is held by said holding members with cushion members being interposed therebetween.

8. An ice stock level detecting apparatus according to claim 7, wherein said pair of holding members are disposed at a same positional level.

9. An ice stock level detecting apparatus according to claim 5, wherein said holding members have apertures formed therein for holding said sensor element at said end portions, the top end portion of said protecting member extending with an inclination toward said apertures, a distance between said upper edge of said top end portion of said protecting member and said sensor element is progressively increased toward said heater by downwardly inclining said upper edge relative to said sensor element.

* * * * *